United States Patent [19]

Odagawa et al.

[11] Patent Number: 5,087,919
[45] Date of Patent: Feb. 11, 1992

[54] ON-BOARD NAVIGATION APPARATUS

[75] Inventors: Satoshi Odagawa; Takashi Kashiwazaki; Morio Araki; Atsuhiko Fukushima; Kazuhiro Akiyama, all of Kawagoe, Japan

[73] Assignee: Pioneer Electronic Corporation, Tokyo, Japan

[21] Appl. No.: 549,512

[22] Filed: Jul. 6, 1990

[30] Foreign Application Priority Data

Sep. 5, 1989 [JP] Japan .................. 1-230036
Sep. 6, 1989 [JP] Japan .................. 1-231150

[51] Int. Cl.⁵ ............................................. H04B 7/185
[52] U.S. Cl. .................................. 342/357; 342/457; 364/450
[58] Field of Search ............... 342/357, 457; 364/449, 364/450

[56] References Cited

U.S. PATENT DOCUMENTS 4,849,827  7/1989  Hashimoto et al. ............ 364/449
4,903,212  2/1990  Yokouchi et al. .............. 364/449
4,949,268  8/1990  Nishikawa et al. ............ 364/449
4,954,959  9/1990  Moroto et al. ................. 364/449

Primary Examiner—Theodore M. Blum
Attorney, Agent, or Firm—Sughrue, Mion, Zinn, Macpeak & Seas

[57] ABSTRACT

An on-board navigation apparatus having a GPS receiver detects a difference between the current and the previous values of the estimated current position in terms of the longitude and latitude information gained from GPS data. The difference is added to the coordinates of the previously established position, the result being taken for the coordinates of the estimated current position. This makes it possible to estimate the current position coordinates accurately even if the accuracy of GPS data is not high enough. When the GPS receiver is in a two-dimensional measuring state, the coordinates of the estimated current position are obtained from a manually or automatically designated elevation value and from the GPS data. This allows the current position coordinates to be estimated with accuracy even if the accuracy of GPS data has dropped due to the two-dimensional measuring instead of a three-dimensional measuring.

14 Claims, 6 Drawing Sheets

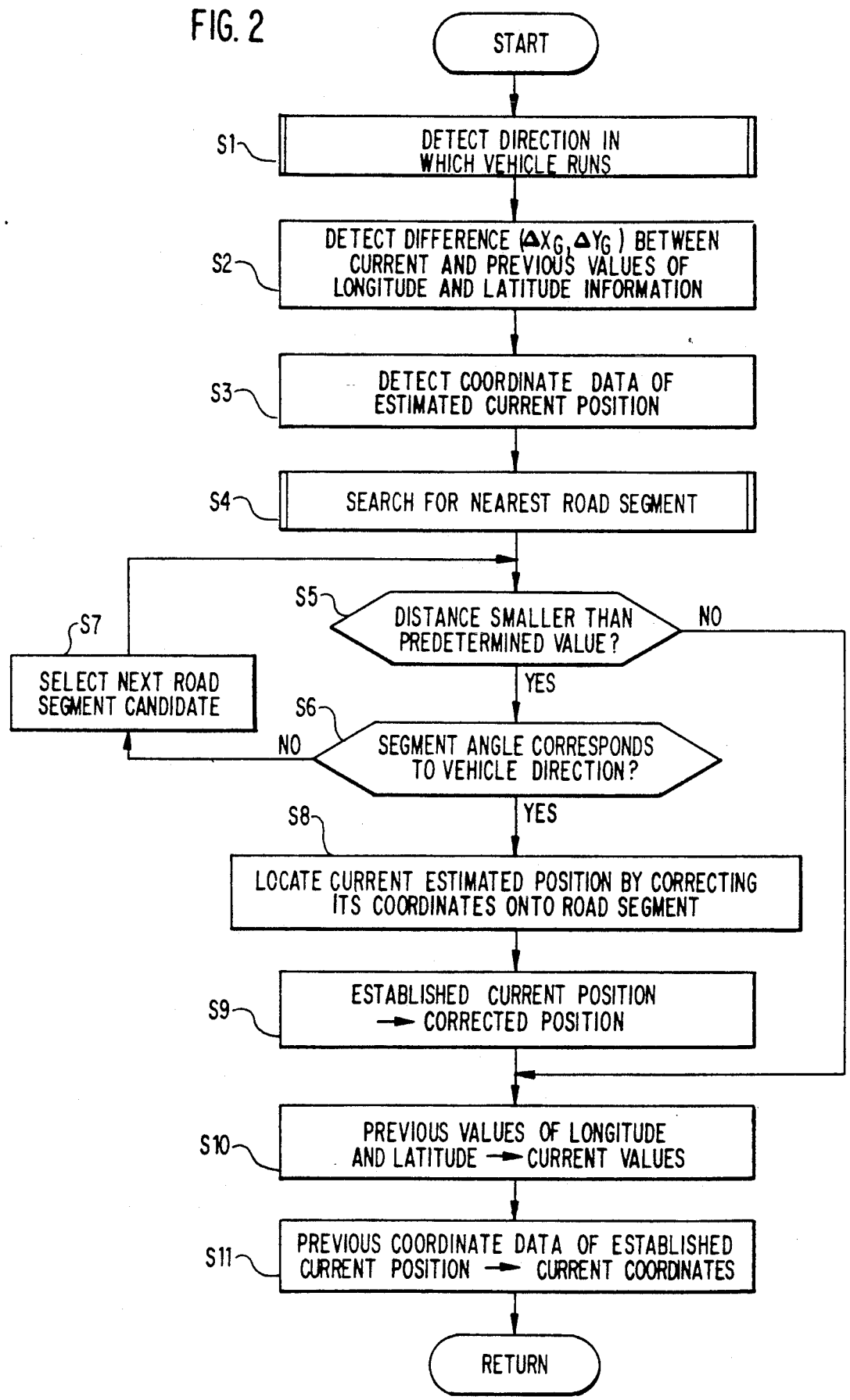

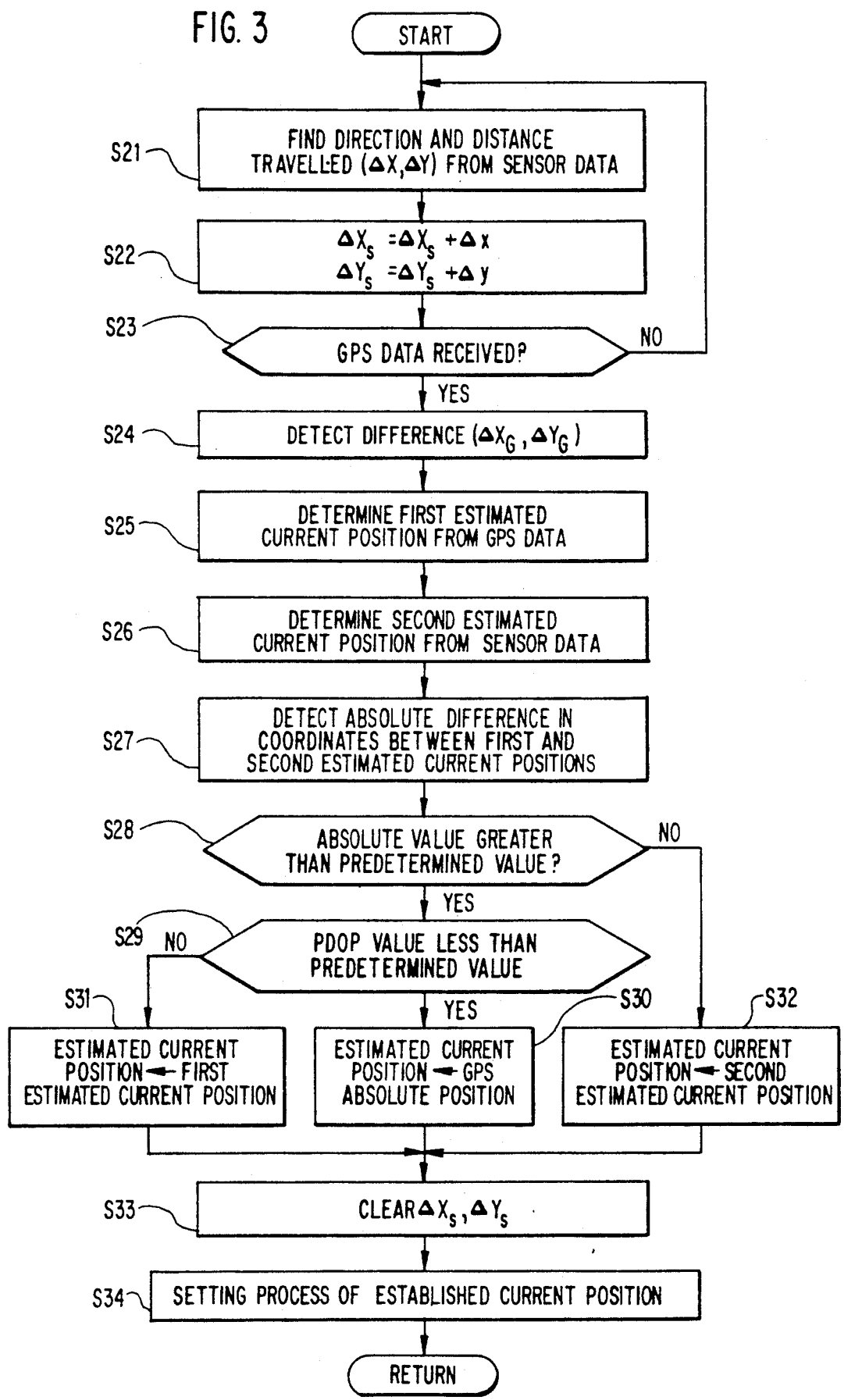

ON-BOARD NAVIGATION APPARATUS

BACKGROUND OF THE INVENTION

1. Field of the Invention

The present invention relates to a navigation apparatus for use in a vehicle, and more particularly to an on-board vehicle navigation apparatus having a GPS (Global Positioning System) receiver that outputs coordinate data indicating the absolute position of the vehicle.

2. Description of Background Information

In recent years, navigation apparatuses which are for use in vehicles and which operate on the following principles have been developed and put into practical use. The typical navigation apparatus of this kind has a recording medium such as CD-ROM that contains map data including road data obtained by translating points on road segments into numerical form. While recognizing the current vehicle position, the apparatus reads from its recording medium a map data group of a region having a given area containing the current vehicle position. The data group is shown in a display device as the map indicating the current vehicle position and its surroundings. When displayed, the map automatically pinpoints the current vehicle position.

The above-described navigation apparatus has direction and distance sensors, the former acquiring the direction in which the vehicle is running and the latter obtaining the distance traveled by the vehicle. The direction and distance thus gained are used to estimate the current position of the vehicle in which the apparatus is mounted. Both the direction and distance data from the sensors generally contain a few percentage of error. That error is inevitably translated into a certain displacement of the current position of the vehicle estimated from the data relative to the actual position thereof.

Another kind of on-board navigation apparatus utilizes longitude and latitude information based on the data from a GPS receiver (called GPS data) to estimate the absolute vehicle position with an appreciably high degree of accuracy. The current vehicle position is then estimated according to the absolute position based on the GPS data. Because this kind of navigation apparatus has its GPS receiver receive signals from satellites at intervals of a few seconds, a scheme may be devised whereby the satellite-originated data are interpolated by the data from the direction and distance sensors mounted in the vehicle.

Some disadvantages are inherent in the above-outlined scheme. The fact that the vehicle, hence its GPS receiver, changes its position constantly makes it sometimes difficult for the receiver to keep an adequate positional relation with the available satellites or to receive signals from a sufficient number thereof. In such cases, the accuracy of the GPS data may be degraded. Inaccurate GPS data or low degrees of precision in road data may cause the vehicle position to be displayed off the road network on display, straining the credibility of the apparatus from the user's point of view.

The measuring of the position by the on-board vehicle navigation apparatus is usually accomplished by having its GPS receiver receive signals from three of four satellites. Where signals are received from three satellites, the two-dimensional position (referred to as two-dimensional position measurement hereinafter); where signals are received from four satellites, the three-dimensional position of the vehicle (in longitude, latitude and elevation) is measured (referred to a three-dimensional position measurement hereinafter).

One disadvantage of the above setup is that as the vehicle runs, the receiving position of the GPS receiver of the on-bard vehicle navigation apparatus keeps changing relative to the signal-emitting satellites. That means it is not always possible to continue receiving signals from four satellites for three-dimensional position measurement. Depending on its signal-receiving position, the GPS receiver may operate on signals from only three satellites, to start the two-dimensional measurement. In that case, the elevation value of the vehicle is not obtained. The inability to find where the vehicle is in terms of elevation can lower the accuracy of the current position coordinates, especially where the terrain has significant undulations.

One solution to the above-described problem is to describe beforehand the elevation values in map data. An obvious disadvantage of this scheme is that its implementation requires preparing impracticably large amounts of elevation data. Even if the data have been prepared, their huge quantities tend to either crowd out an appreciable amount of the map data from memory, or call for large memory capacities in which to store the road data temporarily.

SUMMARY OF THE INVENTION

It is therefore an object of the present invention to provide an on-board vehicle navigation apparatus which reliably displays the current vehicle position in a map when the accuracy of GPS data or map data is not sufficiently high.

It is another object of the present invention to provide an on-board vehicle navigation apparatus capable of accurately estimating the current vehicle position when the GPS receiver is in such a poor receiving state that it ensures only the two-dimensional position measurement instead of a three-dimensional position measurement.

According to one aspect of the present invention, the on-board vehicle navigation apparatus comprises a GPS receiver which outputs coordinates representing the absolute vehicle position, and a reading means for reading a map data group from a recording medium, the medium containing road data obtained by translating points of map-described road segments into numerical form, the medium further containing a plurality of map data groups corresponding to a plurality of areas. The navigation apparatus is configured to recognize the current vehicle position on the basis of the GPS data, and to read from the recording medium the map data about a specific area covering that current position so that a display device may display the position and its surroundings. The apparatus is provided with means by which the difference between the current measurement and the previous one in terms of longitude and latitude information acquired from the GPS data is added to the coordinate data of the currently established position, the resulting coordinate data being regarded as the coordinate data of the currently estimated vehicle position.

In the on-board navigation apparatus according to the first aspect of the present invention, a map data group of a specific area covering the current vehicle position is extracted from the recording medium while the current vehicle position is recognized by using the GPS data, so that a map around the current position and the current vehicle position are displayed in the display part. The difference between the present value and the previous value of the longitude and latitude information obtained from the GPS data is calculated and the difference is added to the coordinate data of the current position established previous time, the coordinate data obtained by the addition is derived as the currently estimated coordinate data.

According to another aspect of the present invention, the on-board vehicle navigation apparatus comprises judging means for determining if the GPS receiver is in two-dimensional measuring state; tentative current position setting means for setting a tentative current position; elevation value setting means for acquiring an elevation value of the tentative current position on the basis of the coordinate data of the tentative current position and on the data output from the GPS receiver; and means for obtaining, when the judging means judges the GPS receiver to be in two-dimensional measuring state, the coordinate data of the current position from the GPS data and from the elevation value by the elevation value setting means.

The on-board vehicle navigation apparatus further comprises: means for acquiring the coordinate data of a reference current position estimated from the GPS data and from a reference elevation value; means for searching the map data groups for data group which represents the road segment near to the estimated reference current position; tentative elevation value setting means for establishing a plurality of tentative elevation values different from the reference elevation value; means for obtaining the coordinate data of a plurality of tentative current positions estimated from the GPS data and from a plurality of tentative elevation values; selecting means for selecting, from among the coordinate data of the plurality of tentatively estimated current positions, the coordinate data of the tentatively estimated current position closest to the coordinate data of the close road segment data groups; computing means for computing the elevation value of the estimated current position based on the tentative elevation value corresponding to the coordinate data of the selected tentatively estimated current position; and means for obtaining, when the judging means judges the GPS receiver to be in two-dimensional measuring state, the coordinate data of the current position based on the GPS data and on the elevation value computed by the computing means. In the on-board navigation apparatus according to the second aspect of the present invention, while recognizing the current vehicle position based on GPS data, from the recording medium the map data about a specific geographical area covering that current position is read so that the display device may display the position and its surroundings. If the GPS receiver is found to be in two-dimensional measuring state, the apparatus obtains the elevation value of a tentative current position established manually or automatically, and then acquires the coordinate data of the estimated current position on the basis of the elevation value and the GPS data.

BRIEF DESCRIPTION OF THE DRAWINGS

FIG. 2 is a flowchart showing one series of steps executed by the CPU in establishing the coordinates of the current vehicle position;

FIG. 3 is a flowchart depicting another series of steps executed by the CPU in establishing the coordinates of the current vehicle position.

DETAILED DESCRIPTION OF THE PREFERRED EMBODIMENT

The preferred embodiment of the present invention will now be described by referring to the accompanying drawings.

Figure 1:
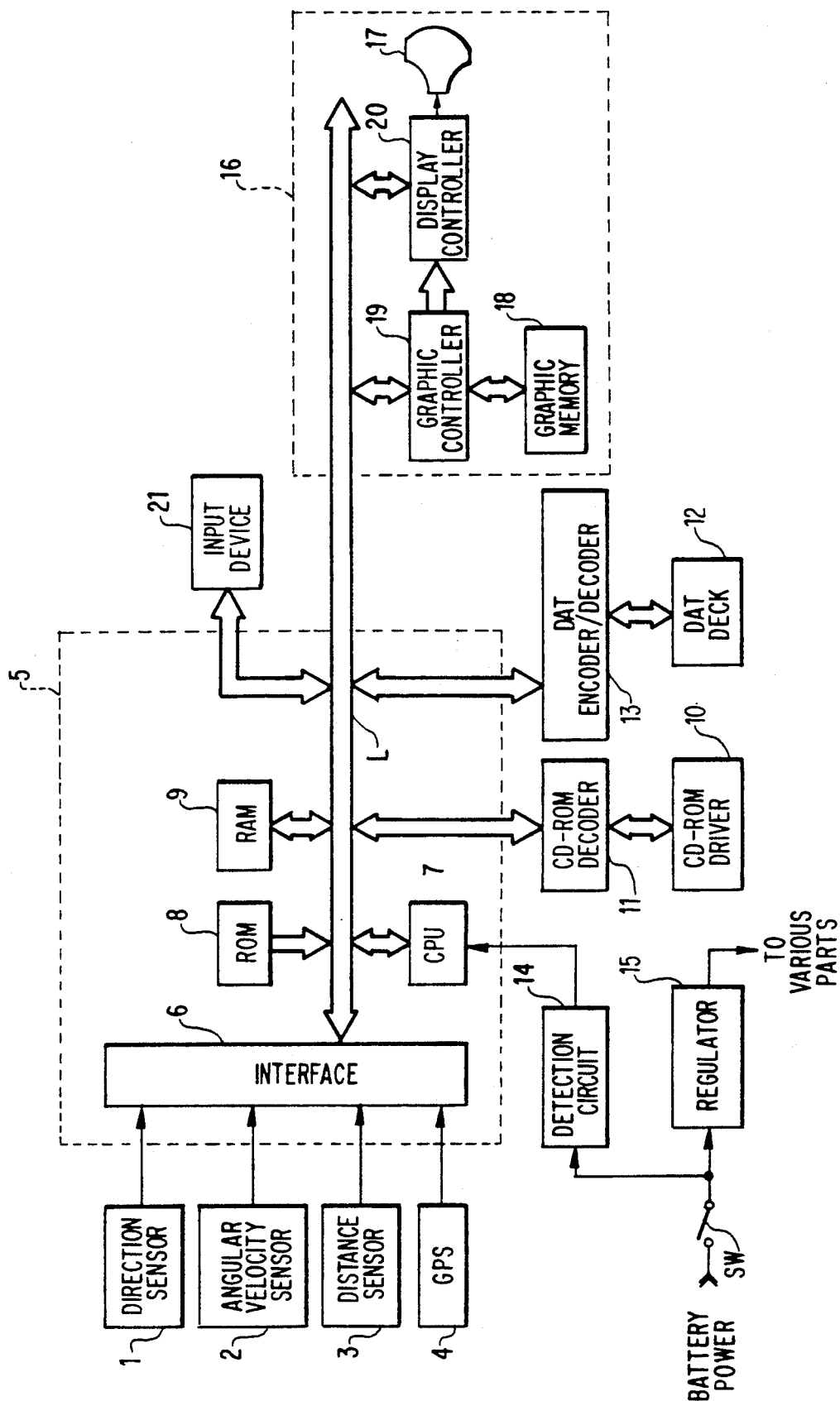
FIG. 1 is a block diagram of a preferred embodiment of the on-board vehicle navigation apparatus according to the present invention.

FIG. 1 illustrates the referred embodiment of the invention in block diagram format. In FIG. 1, reference numeral 1 is a direction sensor for detecting the direction in which the vehicle runs; numeral 2 is an angular velocity sensor for detecting the angular velocity of the vehicle; numeral 3 is a distance sensor for detecting the distance traveled by the vehicle; numeral 4 is a GPS receiver for detecting the absolute position of the vehicle based on longitude and latitude information and other relevant information gained from satellites. The outputs from these sensors including the GPS receiver are supplied to a system controller 5. The direction sensor 1 may be a geomagnetic sensor that detects the direction of the vehicle's progress by having recourse to geomagnetism.

The system controller 5 comprises an interface 6, a CPU (central processing unit) 7, a ROM (read only memory) 8 and a RAM (random access memory) 9. The interface 6 receives sensing outputs from the sensors 1 through 4 and subjects them to analog-to-digital (A/D) conversion and other related processing. The CPU 7 performs diverse kinds of image data processing, and computes the distance and direction in which the vehicle has traveled as well as the coordinates of the current position thereof (longitude and latitude), the computing being based on those data from the sensors 1 through 4 which are successively forwarded from the interface 6. Various processing programs and other necessary pieces of information are stored in the ROM 8 previously, the programs being performed by the CPU 7. The RAM 9 is a memory to and from which to write and read the information needed to perform the programs.

An external recording medium is provided. The medium may be a read-only nonvolatile recording medium such as a CD-ROM or a nonvolatile recording medium such as a DAT (digital audio tape) to and from which data may be written and read. The external recording medium may also be other types of nonvolatile memory such as IC cards. The CD-ROM may beforehand contain in digital form the map data comprising points of the relevant road network. A CD-ROM driver 10 reads information from the CD-ROM. The reading output from the CD-ROM driver 10 is decoded by a CD-ROM decoder 11 before being placed onto a bus line L.

The DAT, on the other hand, is used as a backup memory to and from which information is written and read by a DAT deck 12. Upon power-off of the vehicle, the coordinates of the current vehicle position and other information stored in the RAM 9 immediately before the power-off are supplied to the DAT deck 12 as backup data via a DAT encoder/decoder 13. When power of the vehicle is resumed, the backup data thus recorded on the DAT are read out by the DAT deck 12. The read-out information is then placed on the bus line L via the DAT encoder/decoder 13 for storage into the RAM 9.

The throw-in or turn-off of the power of the vehicle is detected by a detection circuit 14 that monitors the output level of what is known as an accessory switch SW. The power from a battery, not shown, to the vehicle is stabilized by a regulator 15 before it is supplied to various parts of the vehicle. Depending on the time constant of the circuitry, the output voltage of the regulator 15 is not instantaneously lowered the moment the accessory switch SW is turned off. While the output voltage is being lowered, the backup data are stored in the DAT that is the backup memory.

When the vehicle is running, the CPU 7 computes, at intervals timed by timer-based interruptions, the direction in which the vehicle is advancing on the basis of the output data from the direction sensor 1. Then the CPU 7 estimates the current vehicle position, upon interruption at intervals of a predetermined distance traveled, the estimation being based on the distance traveled and on the direction of the vehicle's movement. Furthermore, the CPU 7 estimates the current vehicle position upon each interruption initiated by the GPS receiver, the estimating being based on the longitude and latitude information obtained from the GPS data. The map data about a specific area containing the current vehicle position estimated either from the sensor data or from the GPS data is gathered from the CD-ROM. The data collected from the CD-ROM are temporarily stored in the RAM 9 before being fed to a display unit 16. The method for acquiring the direction of the vehicle's movement based on the output data from the direction sensor 1 may be the one disclosed in Japanese Patent Laid-open No. 62-130013 or something equivalent.

The display unit 16 comprises a display 17 such as a CRT, a graphic memory 18 containing a V-RAM (video random access memory), a graphic controller 19 and a display controller 20. The graphic controller 19 draws map data in the graphic memory 18 as image data, the map data being sent from the system controller 5, and then outputs the image data. The display controller 20 displays an appropriate map on the display 18 using the image data from the graphic controller 19. An input device 21 may be a keyboard through which the user enters various instructions toward the system controller 5.

Referring to the flowchart of FIG. 2, there will now be described one series of steps executed by the CPU 7 based on the GPS data in order to establish the current vehicle position. The subroutine constituted by the steps in FIG. 2 is called and executed on each interruption by the GPS receiver during execution of a main routine, not shown. The main routine is a routine that allows the CPU 7 to recognize the current vehicle position, read from the CD-ROM the map data group regarding a region having a specific area and containing the current vehicle position, display the map on the display 17 as a map about the current vehicle position, and pinpoint the current vehicle position on the map.

In operation, the GPS receiver initiates an interruption by receiving relevant data from satellites. In step S1, in response to the interruption by the GPS reception the CPU 7 detects the direction in which the vehicle is currently running. The direction may be obtained by a known method such as a method of using the orientation of the velocity vectors gained from the GPS data or by a method of acquiring the output data from the direction sensor 1 as described earlier. In step S2, the CPU 7 obtains a difference ($\Delta XG$, $\Delta YG$) between the current longitude and latitude values and the previous ones. In step S3, the difference ($\Delta XG$, $\Delta YG$) is added to the coordinates of the previously established position, the result being determined as the coordinates of the estimated current position.

In step S4, given the estimated current position, the CPU 7 searches a relevant map data group for an appropriate road segment data group, the road segment data group representing the road segment preferably closest to the estimated current position, the map data group covering a region having a specific area centering on the estimated current position. A method to find the closest road segment data group may be the one disclosed in Japanese Patent laid-open No. 63-115004 or the like. It is preferred that a plurality of road segment data groups be searched for and picked up as candidates.

In step S5, the CPU 7 judges if the shortest distance between the estimated current position and the closest road segment is below a predetermined value, the distance being measured along the line extending from the current position perpendicularly to the road segment, i.e., between the current position and the point of intersection formed on the segment with the perpendicular line. If the measured distance is below the predetermined value, the CPU 7 proceeds to step S6. In step S6, the CPU judges if the angle of the closest road segment substantially matches the vehicle's running direction obtained in step S1. If the angle of the closest road segment fails to match the vehicle's direction, the CPU 7 goes to step S7. In step S7, the CPU selects the next road segment data candidate, and goes back to step S5 to repeat the same process.

If the angle of the closest road segment substantially matches the vehicle's current direction, step S8 is reached. In step S8, the CPU 7 corrects the coordinates of the estimated current position so that that position is located on that closest road segment. In step S9, the corrected coordinates are determined as those of the established current position. In step S10, whether the CPU 7 has established the coordinates of the current position or has judged the shortest distance between the estimated current position and the closest road segment to be in excess of the predetermined value, the CPU 7 retains as the previous values the current longitude and latitude values based on the GPS data. In step S11, the CPU 7 further retains the coordinate data of the established current position as the previous coordinate data.

The steps described above constitute the process of establishing the current vehicle position. The process is repeated every time the GPS receives its data.

Referring to the flowchart of FIG. 3, there will now be described another series of steps taken by the CPU 7 to establish the current vehicle position. With this embodiment, the sensor data from the direction sensor 1 and distance sensor 3 are combined with the GPS data in establishing the current position. The subroutine comprising the steps in FIG. 3 is called and executed at predetermined intervals during execution of the main routine.

In step S21, the CPU 7 detects the amount traveled by the vehicle per unit time ($\Delta x$, $\Delta y$) based on the sensor data from the direction sensor 1 and distance sensor 3. In step S22, the CPU 7 accumulates the amount traveled per unit time ($\Delta x$, $\Delta y$). The two steps are repeated until GPS data are found to be received in step S23. In this manner, the CPU 7 acquires the amount traveled between the previous and the current reception of the GPS data (Δ Xs, Δ Ys).

If reception of the GPS data is recognized, the CPU 7 goes to step S24. In step S24, the CPU 7 obtains a difference (Δ XG, Δ YG) between the previous longitude and latitude values and the current ones based on the GPS data in the same manner as in steps S2 and S3 of FIG. 2. The difference (Δ XG, Δ YG) is added to the coordinates of the previously established vehicle position, the result being determined as the coordinates of a first estimated current position in step S25. In step S26, the amount traveled (Δ Xs, Δ Ys), acquired in step S22, are added to the coordinates of the previously established vehicle position, the result being determined as the coordinates of a second estimated current position.

In step S27, the CPU 7 detects an absolute difference in coordinate data between the first and the second estimated current position. In step S28, a judgment is made to see if the absolute difference is greater than a predetermined value. If the absolute value is found to be greater than the predetermined value in step S28, another judgment is made in step S29 to see if the applicable PDOP (position dilution of precision) value is smaller than another predetermined value.

The PDOP value is a value that indicates the positional status of the satellites sending data. The smaller the value detected via the GPS receiver, the better the positional status of the satellites and the higher the precision of their positions. If the PDOP value is found to be lower than the predetermined value, the CPU 7 proceeds to step S30. In step S30, the CPU 7 selects as the coordinate data of the currently estimated position those representing the absolute position based on the GPS data. If the PDOP value is found to exceed the predetermined value, the CPU 7 goes to step S31, selecting as the coordinate data of the currently estimated position those of the first estimated current position based on the GPS data.

If it is found in step S28 that the absolute difference is below the predetermined value, the CPU 7 proceeds to step S32. In step S32, the CPU 7 selects as the coordinate data of the currently estimated position those of the second estimated current position based on the sensor data. In step S33, the amount (Δ Xs, Δ Ys) obtained in step S22 are cleared. In step S34, the CPU 7 corrects the coordinate data of the estimated current position selected in step S30 or S32 so that the current position is located on the closest road segment, the correction being done in the same manner as in steps S4 through S11 of FIG. 2, the CPU further performing processes to determine the corrected coordinate data as those of the established current position. By the operation described above, the series of processing is completed.

As indicated, where the absolute value of the difference between the first and the second estimated current position is in excess of the predetermined value, a judgment is made in terms of the PDOP value, instead of simply determining the first estimated current position as the estimated current position. If the absolute value is below the predetermined value, i.e., if the PDOP value is acceptable, the GPS-based absolute position is determined as the estimated current position. One advantage of this method is that the estimated current position is reset upon each checkup described above. This enhances the reliability of the current position estimates to be subsequently made.

Thus in the preferred embodiment of the invention, the on-board vehicle navigation apparatus recognizes the current vehicle position on the basis of the GPS data, and reads from the recording medium the map data about a region having a specific area covering that current position so that the display device may display the position and a map of its surroundings. The difference between the current measurement and the previous one in terms of longitude and latitude information acquired from the GPS data is added to the coordinate data of the previously established position, the resulting coordinates being determined as those of the currently estimated vehicle position. This scheme allows the current vehicle position to be estimated with a substantially high degree of accuracy even if the GPS data happen to be relatively inaccurate.

One feature of the above embodiment is that given the estimated current position, the road segment data group representing the road segment closest thereto is searched from the relevant map data group, the current position being corrected so as to be located on the closest road segment, the coordinate data of the corrected current position being regarded as those of the established current position. This makes it possible not to let the longitude and latitude information from the GPS data appear as the absolute position but to indicate the appropriate road segment represented by the road data as the established current position. Even if the GPS data or map data are not accurate enough, the current vehicle position can be displayed in a map without lowering the credibility of the navigation apparatus by showing the vehicle to be located in an unlikely place.

Figure 4A:
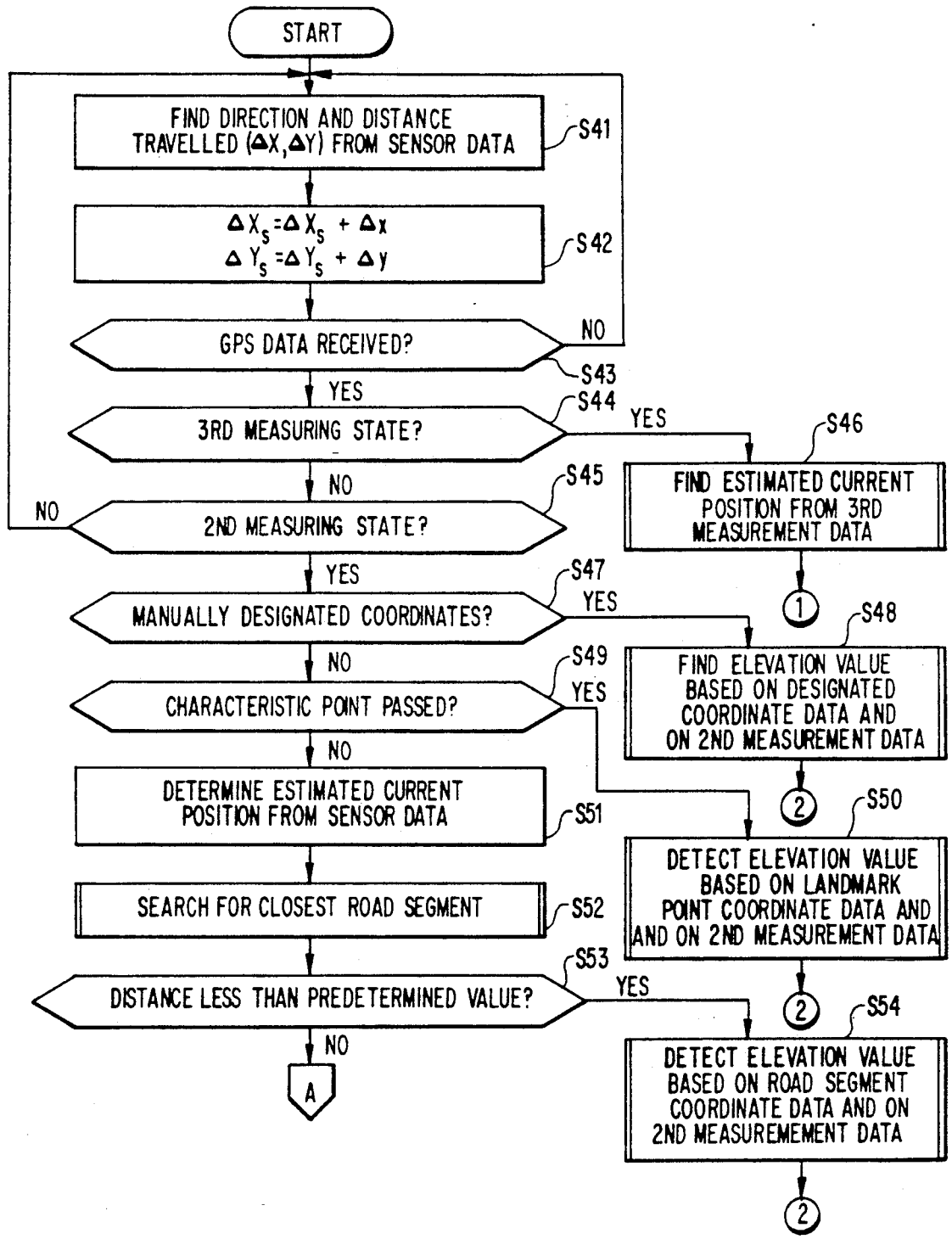
FIGS. 4A through 4C are flowcharts showing a further series of steps executed by the CPU in establishing the coordinates of the current vehicle position.
Figure 4B:
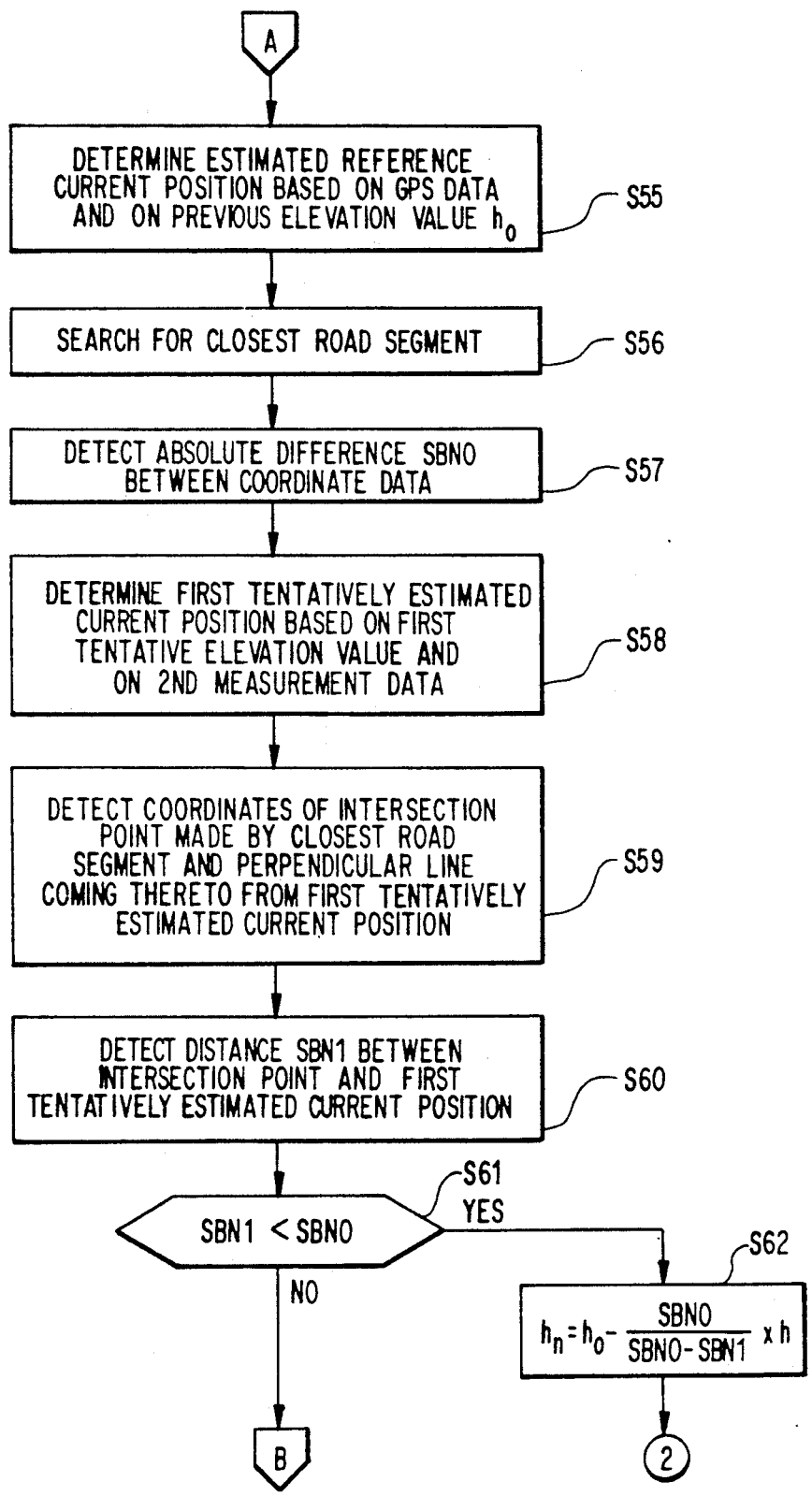
Figure 4C:
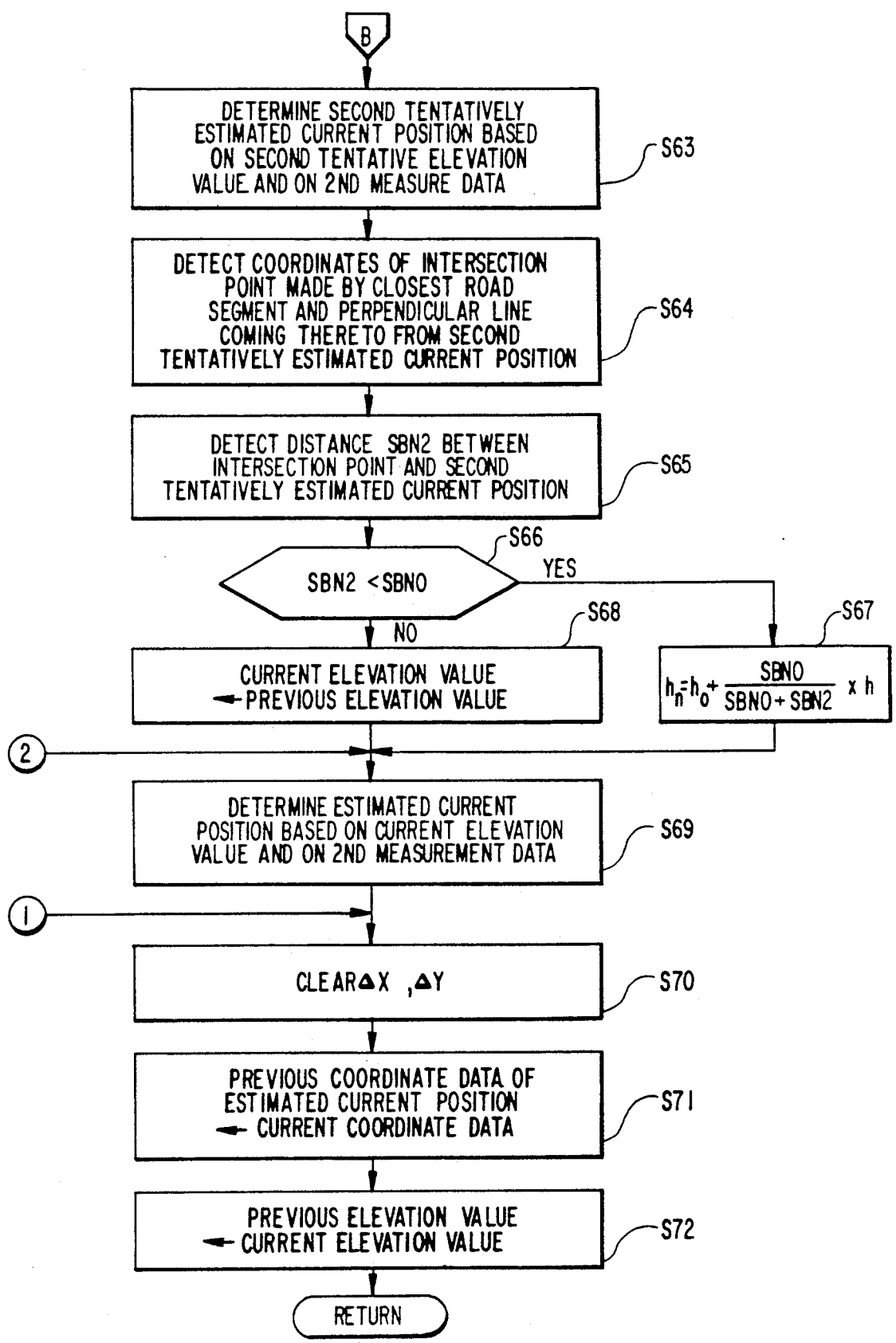

Referring to the flowcharts of FIGS. 4A through 4C, there will now be described a further series of steps executed by the CPU 7 to estimate the current vehicle position. The subroutine comprising the steps in these figures is called and executed at predetermined intervals during execution of a main routine, not shown. The main routine is a routine that allows the CPU 7 to recognize the current absolute vehicle position, read from the CD-ROM the map data group regarding a region having a specific area containing that vehicle position, display the map comprising the vehicle position on the display 17, and pinpoint the current vehicle position on the map.

In step S41, the CPU 7 detects the amount traveled by the vehicle per unit time (Δ x, Δ y) based on the sensor data from the direction sensor 1 and distance sensor 3. In step S42, the CPU 7 accumulates the amount traveled per unit time (Δ x, Δ y). The two steps are repeated until GPS data are found to be received in step S43. In this manner, the CPU 7 acquires the amount traveled between the previous and the current reception of the GPS data (Δ Xs, Δ Ys).

If the GPS data are found to be received in step S43, the CPU 7 judges in step S44 if the GPS receiver is in the state of three-dimensional position measurement. If the GPS receiver is not in the state of three-dimensional position measurement, the CPU 7 proceeds to step S45. In step S45, the CPU 7 judges if the GPS receiver is in the state of two-dimensional position measurement. These judgments are made on the basis of identification information from the GPS receiver indicating that it is in three- or two-dimensional position measurement state.

If the GPS receiver is in the state of three-dimensional position measurement, the CPU 7 goes to step S46, acquiring the coordinate data of the estimated current position on the basis of the three-dimensional measurement data from the GPS receiver. The CPU 7 then proceeds to step S30. If the GPS receiver is in the state of two- dimensional position measurement, the CPU 7 detects an elevation value of the current position using various techniques to be described later. On the basis of the elevation value and on the two-dimensional measurement data from the GPS receiver, the CPU 7 acquires the coordinates of the estimated current position.

In step S47, the CPU 7 judges if a tentative current position is manually designated. The tentative current position may be a desired position on the map appearing on the display 17, the desired position being coordinates or a point on a road segment, the point being designated by using the cursor keys of the input device 21. If any tentative current position is found manually designated in step S47, the CPU 7 goes to step S48. In step S48, the CPU 7 acquires the elevation value of the tentative current position from the coordinate data thereof and from the two-dimensional measurement data, the coordinate data being found from the map data group representing the map shown on the display 17.

If no tentative current position is found manually designated in step S47, the CPU goes to step S49. In step S49, the CPU 7 checks to see if the vehicle has passed by any characteristic point such as a crossing. If a characteristic point is found passed, the CPU 7 goes to step S50, regarding that point as a tentative current position. In step S50, the CPU 7 acquires the elevation value of the tentative current position from the coordinate data thereof and from the two-dimensional position measurement data, the coordinate data being obtained from the map data group representing the map shown on the display 17.

If no tentative current position is found designated and no characteristic point is found passed, the CPU 7 goes to step S51. In step S51, the CPU 7 adds the amount ($\Delta$ Xs, $\Delta$ Ys) obtained in step S2 to the coordinate data of the previously estimated position, the result thereof being determined as the coordinate data of the estimated current position. In step S52, the CPU 7 searches a relevant map data group for an appropriate road segment data group, the road segment data group preferably representing the road segment closest to the estimated current position, the map data group covering a region having a specific area centering on the estimated current position. A method to find the closest road segment data group may be the one disclosed in Japanese Patent laid- open No. 63-115004 or the like. In step S53, the CPU 7 judges if the shortest distance between the estimated current position and the closest road segment is below a predetermined value, the distance being measured along the line extending from the current position perpendicularly to the road segment, i.e., between the current position and the point of intersection formed on the segment with the line. If the measured distance is below the predetermined value, the CPU 7 proceeds to step S54. In step S54, the CPU 7 acquires the elevation value of the current position based on the two-dimensional position measurement data and on the coordinate data of the point of intersection on the closest road segment.

If the shortest distance between the estimated current position and the closest road segment is found to be above the predetermined value, the CPU 7 goes to step S55. In step S55, the CPU 7 for instance takes the previous elevation value $h_0$ for a reference elevation value, and acquires the coordinate data of a reference estimated current position from that elevation value and from the two-dimensional position measurement data. In step S56, the CPU 7 searches a relevant map data group for an appropriate road segment data group, the road segment data group preferably representing the road segment closest to the reference estimated current position, the map data group covering a region having a specific area centering on that reference estimated current position. In step S57, the CPU 7 obtains an absolute difference SBN0 in coordinate data between the reference estimated current position and that point on the road segment closest thereto, the difference representing the shortest distance from the current position up to the point of intersection on the closest road segment made by the perpendicularly intersecting line originating from the current position.

In step S58, the CPU 7 subtracts a predetermined value h from the previous elevation value $h_0$, determines the result ($h_0 - h$) as a first tentative elevation value, and determines the coordinate data of a first tentatively estimated current position based on the first tentative elevation value and on the two-dimensional position measurement data. In step S59, the CPU 7 acquires the coordinate data of the intersection point formed by the closest road segment and the line originating from the first tentatively estimated current position and perpendicular to that road segment. In step S60, the CPU 7 detects a distance SBN1 between the first tentatively estimated current position and the intersection point. In step S61, the CPU 7 judges if the distance SBN1 is smaller than the absolute distance SBN0. If SBN1 < SBN0, then the elevation value $h_n$ of the current position is obtained in step S62 by the following equation:

$$h_n = h_0 - \frac{SBN0}{SBN0 - SBN1} \times h$$

If SBN1 $\geq$ SBN0, the CPU adds the predetermined value h to the previous elevation value, determines the result ($h_0 + h$) as a second tentative elevation value, and determines a second tentatively estimated current position based on the second tentative elevation value and on the two-dimensional position measurement data in step S63. In step S64, the CPU 7 acquires the coordinates of the intersection point formed by the closest road segment and the line originating from the second tentatively estimated current position and perpendicular to that road segment. In step S65, the CPU 7 detects a distance SBN2 between the second tentatively estimated current position and the intersection point. In step S66, the CPU 7 judges if the distance SBN2 is smaller than the absolute distance SBN0. If SBN2 < SBN0, then the elevation value hn of the current position is obtained in step S67 by the following equation:

$$h_n = h_0 + \frac{SBN0}{SBN0 - SBN2} \times h$$

If SBN2 $\geq$ SBN0, the CPU 7 determines the previous elevation value $h_0$ as the current elevation value $h_n$ in step S67.

In other words, in steps S55 through S68, the coordinate data of the reference estimated current position is obtained from the GPS data and from the reference elevation value (e.g., previous elevation value $h_0$). The CPU 7 then searches relevant map data group for an appropriate road segment data group, the road segment data group preferably representing the road segment closest to the reference estimated current position. Meanwhile, a first and a second tentative elevation value different from the reference elevation value are set. On the basis of these tentative elevation values and the GPS data, the coordinate data of a first and a second tentatively estimated current position is acquired. Then the elevation value of the current position is computed by using the tentative elevation value corresponding to the tentatively estimated current position that is closest to the coordinates on the nearest road segment. If the reference estimated current position is closer to the coordinates on the nearest road segment than the first or second tentatively estimated current position is, the reference elevation value is set as the elevation value of the estimated current position.

When the elevation value of the current position is obtained in step S48, S50, S54, S67 or S68, the CPU 7 acquires the coordinate data of the estimated current position from that elevation value and from the two-dimensional position measurement data in step S69. In step S70, the CPU 7 clears the accumulated direction and distance (Δ Xs, Δ Ys) obtained in step S42. In step S71, the current coordinates of the estimated current position is determined as previous coordinates. In step S72, the obtained current elevation value is determined as the previous elevation value. This completes the whole series of steps taken by the CPU 7 to estimate the current vehicle position.

In the embodiment described above, the previous elevation value is set as the reference elevation value. Alternatively, the reference elevation value may be any empirically obtained constant value that is deemed appropriate. In the above embodiment, two tentative elevation values (reference elevation value±h) are set so that the coordinate data of two tentatively estimated current positions are acquired. Alternatively, three or more tentative elevation values may be used.

The on-board vehicle navigation apparatus embodied above according to the invention recognizes the current vehicle position based on GPS data, and reads from the recording medium the map data of a region having a specific area covering that current position so that the display device may display the position and a map of its surroundings. When the GPS receiver of the apparatus is in the state of two-dimensional position measurement, the apparatus detects the elevation value of a tentative current position set manually or automatically. Then based on the elevation data and on the GPS data, the coordinate data of the estimated current position is acquired. This navigation apparatus makes it possible to estimate the current vehicle position with high degrees of accuracy even if its GPS receiver is in two-dimensional position measuring state, e.g., caused by a poor receiving condition of the GPS receiver.

It is to be understood that while the invention has been described in conjunction with a specific embodiment, it is evident that many alternatives, modifications and variations will become apparent to those skilled in the art in light of the foregoing description. Accordingly, it is intended that the present invention embrace all such alternatives, modifications and variations as fall within the spirit and scope of the appended claims.

What is claimed is:

1. In an on-board vehicle navigation apparatus comprising:

a GPS receiver which outputs the coordinates representing the absolute position of a vehicle equipped with said apparatus; and reading means for reading a map data group from a recording medium, said medium containing road data obtained by translating points of road segments in a map into numerical form, said medium further containing a plurality of map data groups corresponding to a plurality of regions, wherein said navigation apparatus recognizes a current vehicle position on the basis of output data from said GPS receiver, and reads from said recording medium map data of a region having a specific area containing said current position so that a display device may display said current vehicle position and a map of its surroundings, the improvement comprising:

means for acquiring a difference between current measurement values and previous values of longitude and latitude information acquired from the output data from said GPS receiver; and means for adding said difference to coordinate data of a previously established vehicle position, and determining a result from said addition as the coordinate data of an estimated current position.

2. An on-board vehicle navigation apparatus according to claim 1, further comprising:

means for searching said map data groups for a road segment data group representing a road segment close to said estimated current position; and means for correcting said coordinate data of said estimated current position so that said position is located on said road segment represented by said road segment data group searched out, and determining corrected coordinate data as those of an established current position.

3. An on-board vehicle navigation apparatus according to claim 2, wherein the angle of said road segment represented by said road segment data group searched out substantially corresponds to the orientation of a velocity vector obtained from the output data from said GPS receiver.

4. An on-board vehicle navigation apparatus according to claim 2, further comprising a direction sensor for detecting the direction in which said vehicle runs; wherein the angle of said road segment represented by said road segment data group searched out substantially corresponds to a vehicle running direction obtained from the output data from said direction sensor.

5. In an on-board vehicle navigation apparatus comprising:

a GPS receiver which outputs the coordinate data representing the absolute position of a vehicle equipped with said apparatus;

a distance sensor for detecting the distance traveled by said vehicle;

a direction sensor for detecting the direction in which said vehicle runs; and reading means for reading a map data group from a recording medium, said medium containing road data obtained by translating points on road segments in a map into numerical form, said medium further containing a plurality of map data groups corresponding to a plurality of regions; wherein said navigation apparatus recognizes a current vehicle position based on output data from said GPS receiver or from said distance and direction sensors, and reads from said recording medium map data of a region having a specific area containing said current vehicle position so that a display device may display said current vehicle position and a map of its surroundings, the improvement comprising:
means for acquiring a difference between current measurement values and previous values in terms of longitude and latitude information acquired from the output data from said GPS receiver;
means for adding said difference to coordinate data of a previously established vehicle position, determining a result of said addition as coordinate data of a first estimated current position;
means for acquiring coordinate data of a second estimated current position on the basis of the output data from said distance and direction sensors and coordinate data of said previously established position; and
means for selecting the output data from said GPS receiver as coordinate data of an estimated current position of a present time if an absolute difference in coordinate data between said first and second estimated current positions is above a predetermined value and an applicable PDOP (position dilution of precision) value is below a predetermined value, and for selecting said coordinate data of said first estimated current position as coordinate data of said estimated current position of the present time if said PDOP value is above said corresponding predetermined value.

6. An on-board vehicle navigation apparatus according to claim 5, further comprising:
means for searching said map data groups for a road segment data group representing a road segment close to said estimated current position; and
means for correcting the coordinate data of said estimated current position so that said position is located on said road segment represented by said road segment data group searched out, and determining said corrected coordinate data as coordinate data of an established current position.

7. An on-board vehicle navigation apparatus according to claim 1, further comprising:
judging means for judging if said GPS receiver is in a two-dimensional measuring state;
tentative current position setting means for setting a tentative current position;
elevation value setting means for acquiring an elevation value of said tentative current position on the basis of coordinate data of said tentative current position and output data from said GPS receiver; and
means for obtaining, when said judging means determines said GPS receiver to be the in two-dimensional measuring state, coordinate data of the current vehicle position on the basis of the output data from said GPS receiver and the elevation value set by said elevation value setting means.

8. An on-board vehicle navigation apparatus according to claim 7, wherein said tentative current position setting means further comprises manual input means for manually entering as the tentative current position a desired position in a map shown on said display device.

9. An on-board vehicle navigation apparatus according to claim 7, wherein said tentative current position setting means detects that said vehicle passes a characteristic point and determines said characteristic point as the tentative current position.

10. An on-board vehicle navigation apparatus according to claim 7, wherein said tentative current position setting means further comprises:
a distance sensor for detecting the distance traveled by said vehicle;
a direction sensor for detecting the direction in which said vehicle runs;
means for acquiring coordinate data of an estimated current position on the basis of output data from said distance and direction sensors; and
means for searching said map data groups for a road segment data group representing a road segment close to said estimated current position; wherein coordinate data of said road segment data group which are closest to coordinate data of said estimated current position are selected as coordinate data of the established current position.

11. An on-board vehicle navigation apparatus according to claim 7, further comprising:
means for acquiring coordinate data of a reference estimated current position on the basis of output data from said GPS receiver and a reference elevation value;
means for searching said map data groups for a road segment data group representing a road segment close to said reference estimated current position;
tentative elevation value setting means for setting a plurality of tentative elevation values which are different from said reference elevation value;
means for acquiring coordinate data of a plurality of tentatively estimated current positions on the basis of the output data from said GPS receiver and said plurality of tentative elevation values;
selecting means for selecting coordinate data of the tentatively estimated current position that is closest to coordinate data of said road segment data group, from among coordinate data of said plurality of tentatively estimated current positions;
computing means for computing the elevation value of the estimated current position based on the tentative elevation value corresponding to coordinate data of said tentatively estimated current position selected by said selecting means; and
means for obtaining, when said judging means determines said GPS receiver to be in the two-dimensional measuring state, coordinate data of the current vehicle position of the basis of the output data from said GPS receiver and the elevation value computed by said computing means.

12. An on-board vehicle navigation apparatus according to claim 11, wherein said tentative elevation value setting means adds or subtracts a multiple of a predetermined value to or from said reference elevation value, respectively, and determines the value resulting from said addition or subtraction as said tentative elevation value.

13. An on-board vehicle navigation apparatus according to claim 11, wherein said computing means determines said reference elevation value as the elevation value of the established current position if said reference estimated current position is closer to said estimated current position than said plurality of tentatively estimated current positions.

14. An on-board vehicle navigation apparatus according to claim 11, wherein said reference elevation value is the previous elevation value.

* * * * *